(12) United States Patent
Haim et al.

(10) Patent No.: US 7,206,464 B2
(45) Date of Patent: Apr. 17, 2007

(54) METHOD AND APPARATUS FOR REDUCTION OF PERCEIVED DISPLAY REFLECTIONS

(75) Inventors: Elias S. Haim, Glendale, AZ (US); Brent D. Larson, Cave Creek, AZ (US)

(73) Assignee: Honeywell International, Inc., Morristown, NJ (US)

( * ) Notice: Subject to any disclaimer, the term of this patent is extended or adjusted under 35 U.S.C. 154(b) by 645 days.

(21) Appl. No.: 10/433,188

(22) PCT Filed: Nov. 29, 2001

(86) PCT No.: PCT/US01/44750

§ 371 (c)(1), (2), (4) Date: Dec. 5, 2003

(87) PCT Pub. No.: WO02/063874

PCT Pub. Date: Aug. 15, 2002

(65) Prior Publication Data

US 2004/0081372 A1    Apr. 29, 2004

Related U.S. Application Data

(60) Provisional application No. 60/253,919, filed on Nov. 29, 2000.

(51) Int. Cl.
G06K 9/28 (2006.01)
(52) U.S. Cl. .................................. 382/325; D14/450
(58) Field of Classification Search ............... D14/450; 382/325; 359/177, 601; 348/836; 345/89
See application file for complete search history.

(56) References Cited

U.S. PATENT DOCUMENTS

| | | | |
|---|---|---|---|
| 2,819,459 A | | 1/1958 | Dodd |
| 4,185,220 A | | 1/1980 | Oberg |
| 4,668,026 A | * | 5/1987 | Lapeyre et al. .......... 312/223.3 |
| 5,004,320 A | | 4/1991 | Nagai et al. |
| 5,015,072 A | | 5/1991 | Howell |
| 5,039,907 A | | 8/1991 | Adler |
| 5,150,235 A | * | 9/1992 | Haim et al. ................. 349/107 |
| 5,237,453 A | | 8/1993 | Jones |
| 5,402,141 A | * | 3/1995 | Haim et al. .................... 345/88 |
| 6,050,833 A | * | 4/2000 | Danzyger et al. ............. 439/92 |
| 6,567,061 B1 | * | 5/2003 | Bolotski et al. .............. 345/89 |
| 6,593,981 B1 | * | 7/2003 | Haim et al. ................. 349/106 |
| 6,628,366 B2 | * | 9/2003 | Wu et al. .................... 349/187 |
| 6,871,951 B2 | * | 3/2005 | Blum et al. ................. 351/159 |
| D508,054 S | * | 8/2005 | Ramsey .................... D14/448 |

* cited by examiner

*Primary Examiner*—Joseph Mancuso
*Assistant Examiner*—Nancy Bitar
(74) *Attorney, Agent, or Firm*—Ingrassia Fisher & Lorenz

(57) ABSTRACT

A method and apparatus for reducing the magnitude and edge clarity of the luminosity of an undesired image of a external object reflected from a portion of a surface of a visual display into the eye of a user includes placing a cover in the path of the reflected image. The cover has a surface portion which is not parallel to the portion of the surface of the display. As result the reflections from the cover and from the display surface portions provide multiple images of the external object to the user each having a luminosity magnitude which is less than the magnitude of the luminosity of the undesired image that would occur if the cover was parallel to the display surface portion thereby resulting in super-imposed images.

19 Claims, 3 Drawing Sheets

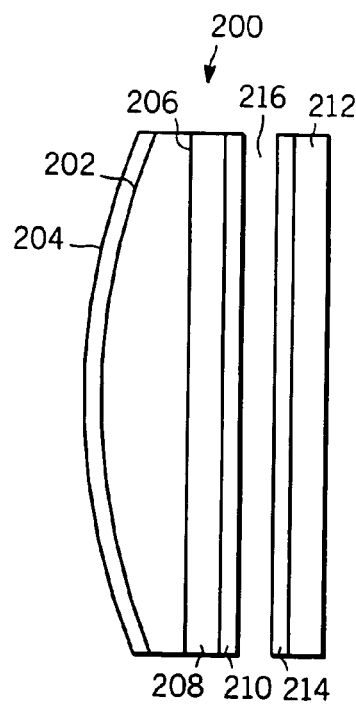
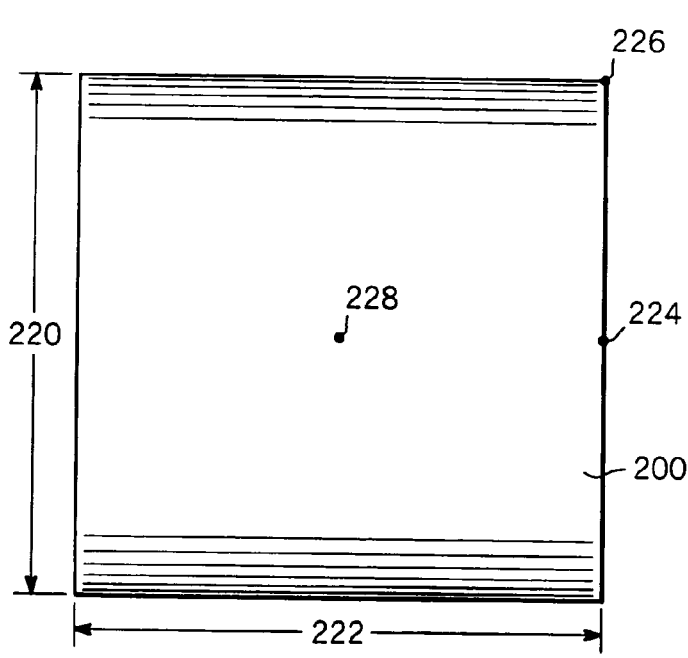
FIG. 9A   FIG. 9B
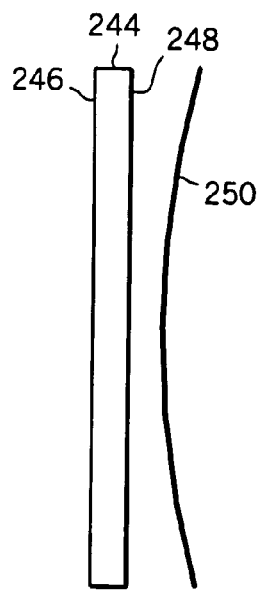
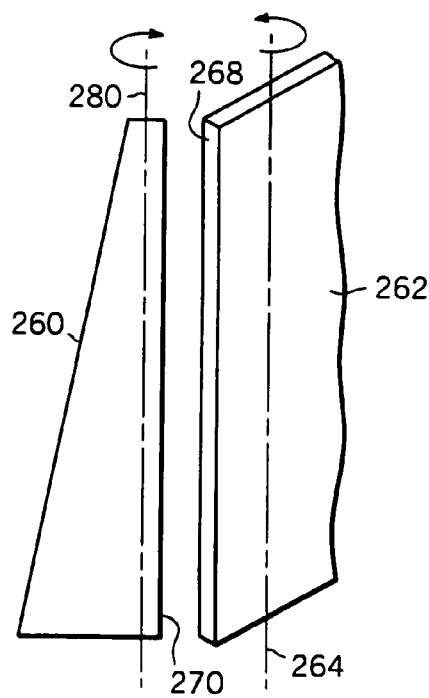
FIG. 10   FIG. 11   FIG. 12

METHOD AND APPARATUS FOR REDUCTION OF PERCEIVED DISPLAY REFLECTIONS

CROSS REFERENCE TO RELATED APPLICATIONS

This application is a U.S. national stage application based on International Application No. PCT/US01/44750, filed Nov. 29, 2001, which claims priority to U.S. Provisional Application No. 60/253,919, filed Nov. 29, 2000.

FIELD OF THE INVENTION

The present invention relates to a method and apparatus for reducing the overall perceived reflectance of an electronic display and more particularly pertains to a method and apparatus for reducing such reflectance by producing double, triple or multiple images of a reflective body.

BACKGROUND OF THE INVENTION

As will be more completely described herein, images reflected off a display comprising for example, a cover glass assembly, liquid crystal display or cathode ray tube, often distract a user, such as a pilot. By minimizing the perceived reflectance, the display becomes more readable and thus more acceptable to the user.

More particularly, light diffusing or other display covers have been bonded to the outer surface of a display to protect the display and to improve the appearance of the informational images provided by the display for the benefit of an observer. However such covers tend to undesirably reflect and increase the luminosity of unwanted reflected images from objects outside of or external to the display into the view of the user.

Also if the outer surface of the bonded layer becomes excessively scratched or damaged it is often necessary to discard and replace the entire expensive display assembly. To solve the foregoing replacement problem a protective layer or cover has been provided which is held away from and parallel to the display surface by a mounting structure. Such protective layer or cover is more easily replaced when damaged than the bonded layer. However such covers also tend to undesirably reflect and increase the luminosity of unwanted reflected images from objects outside of or external to the display into the view of the user.

Accordingly it is desirable to provide an economical structure and method that facilitate the reduction of the magnitude of the luminosity and the reduction of the clarity of unwanted reflections from the cover and from the display. Also it is desirable for such structure to enable the easy and economical replacement of the display cover.

SUMMARY OF THE INVENTION

According to an aspect of the invention there is provided an electronic display for providing visual information for viewing by a user. The display has a first surface portion, which tends to reflect an undesirable image of an object external to the display into the view of the user. A cover is positioned next to the first surface portion of the electronic display. The cover has a second surface portion arranged to be non parallel to the first surface portion, the first and second surface portions thereby reflecting separate dispersed images of the object to provide reduced interference with the visual information being viewed by the user.

According to a further aspect of the invention there is provided a method for reducing the magnitude of the luminosity and the edge clarity of an undesired external image reflected from a first surface of a display into the eye of a user. A cover is placed in the path of the reflected image. The cover has a second surface that is not parallel to the first surface of the display. The image from the second surface of the cover and the first surface of the display is reflected to provide multiple images of the undesired image each having a luminosity magnitude which is less than the magnitude of the luminosity of the undesired image.

BRIEF DESCRIPTION OF THE DRAWING FIGURES

The subject matter of the present invention is particularly pointed out and distinctly described in the following portion of the specification. The invention, however, both as to organization and method of operation, may best be understood by reference to the following description taken in conjunction with the accompanying drawing in which like parts may be referred to by like numerals, and:

FIGS. 5 through 12 are schematic representations of other embodiments of the present invention.

DETAILED DESCRIPTION OF THE DRAWINGS

The subject matter of the present invention is particularly suited for use in connection with aircraft and avionics system displays as shown in U.S. Pat. No. 5,402,141, issued Mar. 28, 1995, to Haim et al and U.S. Pat. No. 5,150,235, issued Sep. 22, 1992 and which are incorporated herein by reference. As a result, the preferred exemplary embodiments of the present invention are described in that context. It should be recognized, however, that such description is not intended as a limitation on the use or applicability of the present invention, but is instead provided merely to enable a full and complete description of the preferred embodiments. For example, the present invention may be applied to laptop displays, personal computer displays, monitors and displays embodied in personal digital assistants, for instance.

Figure 1:
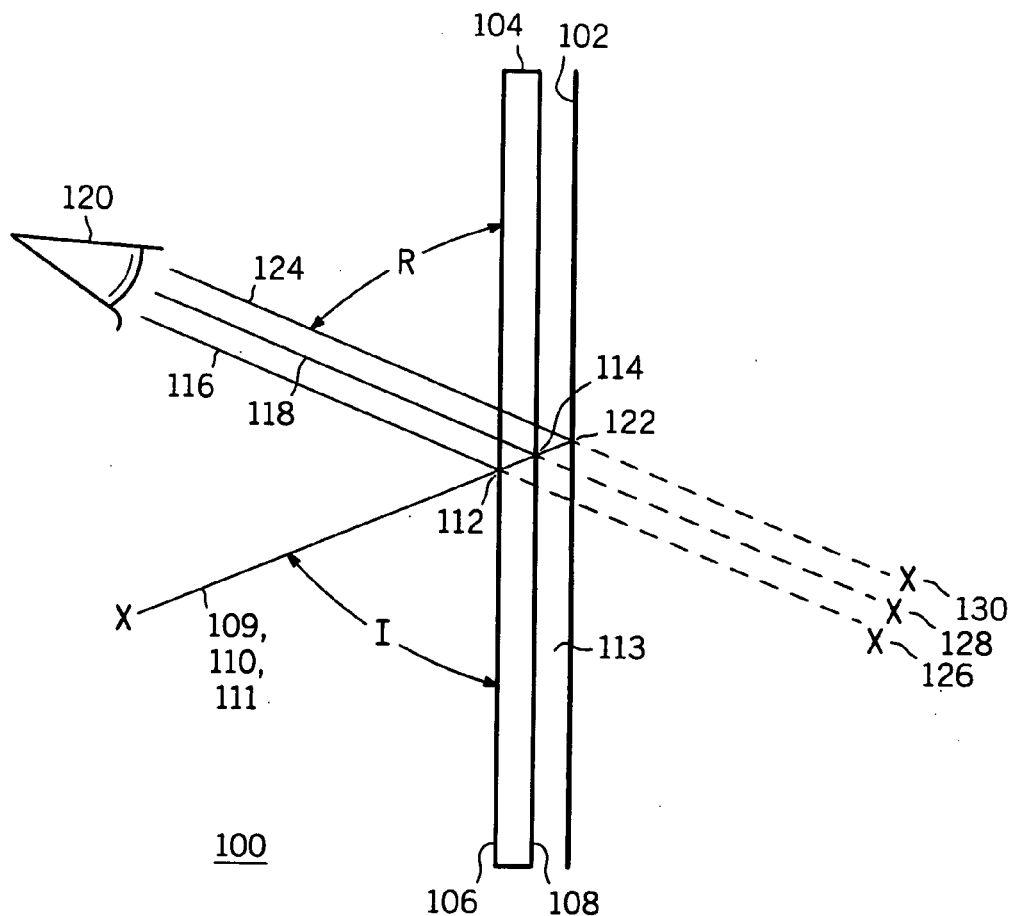
FIG. 1 illustrates a prior art display assembly that provides undesirable reflections off of multiple surfaces of a cover layer and a display surface.

FIG. 1 shows an end view (not to scale) of portions of a prior art structure 100 having a display surface 102 and a display cover 104 with surfaces 106 and 108 that are parallel to surface 102. A liquid crystal matrix for providing visual information to a user is provided behind display surface 102 in a known manner. Gap 113 is provided between surfaces 102 and 108 to facilitate removal of cover plate 104 in the event it is scratched or broken. Gap 113 can be filled with air or an index matching material such as an adhesive, fluid or other material as is known in the art. Cover plate 104 is held in place by a known assembly (not shown), which allows easy interchange of cover plates.

Figure 2:
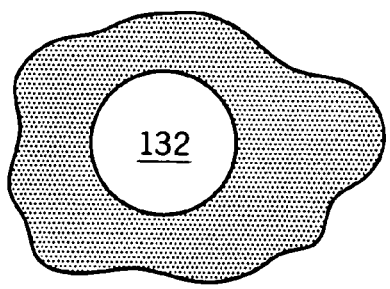
FIG. 2 depicts an undesirable reflection having a high magnitude of luminosity.
Figure 4:
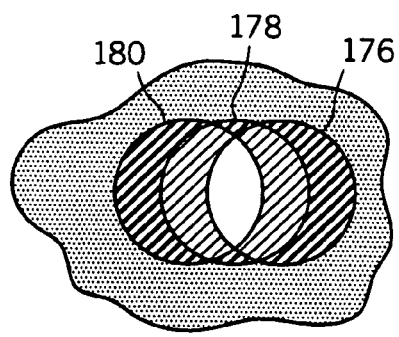
FIG. 4 depicts dispersed undesirable reflections each having a reduced magnitude of luminosity and clarity.

Three superimposed light rays 109, 110 and 111 are reflected by one point X of an image, which is assumed to be a point of the locus of a circle, for ease of discussion. Ray 109 is further reflected to provide ray 116 by point 112 on surface 106. Also another ray 110 is reflected to provide ray 118 by point 114 on surface 108. Rays 116 and 118 are viewed by eye 120 of an observer. For typical viewing geometry's the angles of incidence "I" of rays 109 and 110 and reflection "R" of rays 116 and 118 with respect to respective surfaces 106 and 108 are substantially equal because surfaces 106 and 108 are parallel. Also a further ray 111 is reflected at this same angle by point 122 on display surface 102 into eye 120 as indicated by ray 124. As a result eye 120 tends to see an apparent image at points such as 126,128 and 130 superimposed over the information being provided by the liquid crystal matrix. Although images 126, 128 and 130 are shown as slightly spaced part from each other for purposes of illustration, for representative viewing geometry's they are substantially super-imposed which provides the viewer 120 with an undesirably intense and sharp reflection depicted by the circle 132 of FIG. 2. The high magnitude of the luminosity of the reflection is indicated by the bright interior and stippled exterior of circle 132.

Figure 3:
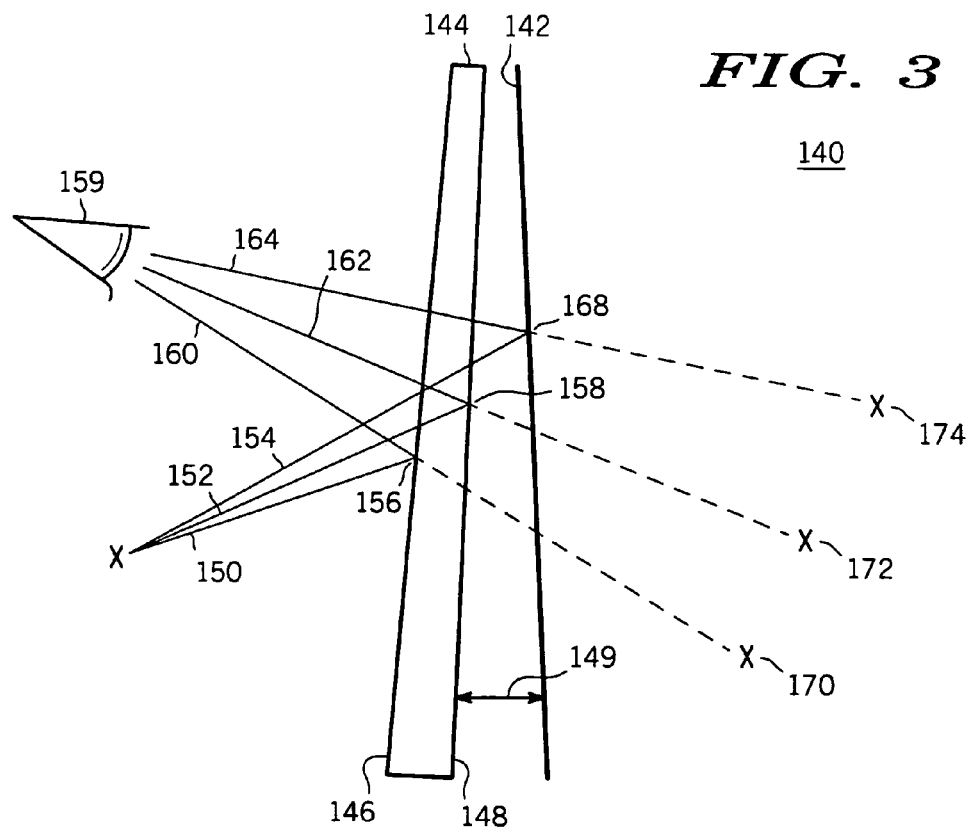
FIG. 3 illustrate a schematic representation of an embodiment of the invention which minimizes the intensity of the undesirable reflections.
Figure 5:
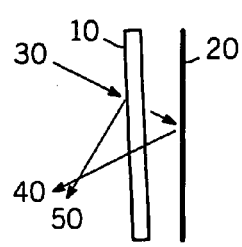
Figure 7:
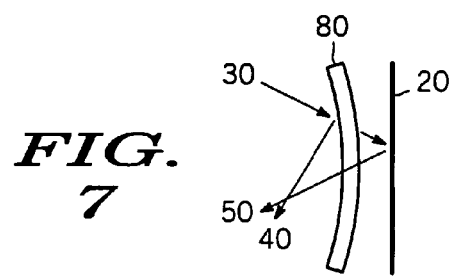
Figure 6:
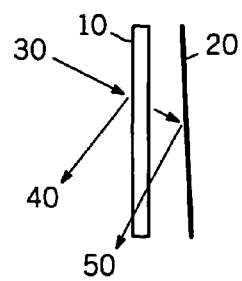
Figure 8:
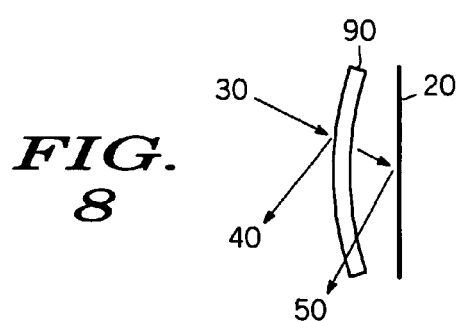

FIG. 3 shows an end view of an embodiment of the invention 140 having a display surface 142 and a wedge shaped display cover 144 with surfaces 146 and 148 that are non-parallel to each other and to surface 142. Gap 149 separates surfaces 142 and 148 that are in close proximity to each other. As previously pointed out gap 149 may be filled with air or other index matching material. Rays 150,152 and 154 are reflected by point X of an undesirable external image that is again assumed to be a point on the locus of a circle for ease of discussion. Ray 150 is reflected by a point 156 on outer surface 146 and ray 152 is reflected by point 158 on inner surface 148 of display cover 144 into the eye 1599 of an observer as respectively indicated by rays 160 and 162. Also ray 154 is reflected by point 168 on display surface 142 as ray 164 into eye 159. These reflections tend to interfere with information being provided through display surface 142.

The angle of incidence and reflection for each individual pair of rays 150,160 and 152,162 and 154,164 is the same. However since surfaces 142, 146 and 148 are not parallel the angles of incidence and reflection for each pair of rays are different from each other. As a result eye 159 sees faint multiple images 170,172 and 174 of reduced luminosity and clarity which provide reduced interference with the desired visual information being provided by the display to eye 159. More specifically, images 170,172 and 174 are spaced part from each other or dispersed to provide the viewer 159 with dispersed multiple images 176, 178 and 180 are not as prominent as circle 132 of FIG. 2 to indicate the desirable reduction in the magnitude of their luminosity and sharpness or edge clarity with respect to the luminosity and sharpness or edge clarity of circle 132.

As shown in FIGS. 5–8, the shape of a cover glass assembly disposed in front of an electronic display 20 is configured in such a way as to produce multiple images 40, 50 of an image 30. In these preferred embodiments, this can be done by placing or disposing a cover glass plate 10 at an angle with respect to the display 20 (see FIGS. 5 and 6) or by providing a curvature on a convex cover glass assembly 80 or a concave cover glass assembly 90 (see FIGS. 7 and 8, respectively). Alternatives include skewing the display 20 at an angle with respect to a cover glass assembly or placing a curvature on the display 20. The goal is to produce non-parallel surfaces which result in multiple reflections 40, 50.

FIGS. 9A and 9B show approximate dimensions of another embodiment of the invention. Polarizing and anti-reflective layers or coatings which can be utilized with any of the embodiments are shown in FIG. 9A. More specifically FIG. 9A shows a side view of embodiment 198 having a convex-planar cover glass 200 with a convex curved surface 202 having a radius of curvature of approximately fifteen meters. An anti-reflective coating 204 is affixed to the front surface of cover glass 200 in a known manner. Cover glass 200 further has a flat or planar surface 206 having a light polarizing layer 208 affixed thereto. An anti-reflective coating 210 is affixed to polarizing layer 208. Also planar display surface 212 has an anti-reflective coating 214 attached thereto. Gap 216 separates the cover glass 200 from the display surface 212. The polarizing layers and the anti-reflective coatings enhance viewing of the polarized light from the liquid crystal devices located behind display surface 212. Since curved surface 202 and display surface 212 are not parallel they tend to reflect multiple images of external objects thereby attenuating the luminosity and clarity thereof by dispersing the reflected images seen by a viewer as has been previously described.

FIG. 9B shows a front view of a square shaped cover glass 200 that corresponds to the side view shown in FIG. 9A. Cover glass 200 could also have a rectangular or even circular front view shape. The height 220 and width 222 of cover glass 200 are each approximately seven and one half inches. The thickness of cover glass 200 at points 224, 226 and 228 are respectively approximately 0.08 inch, 0.07 inch and 0.09 inch. As shown centrally located point 228 is about 5 inches from point 226 and centrally located point 228 is about 3.6 inches from point 224.

As can be appreciated by one skilled in the art there are an infinite number of ways to provide cover and display glasses having non-parallel surfaces in accordance with the invention. For instance, FIG. 10 shows a cover glass 240 with an undulating front surface 242. Moreover FIG. 11 shows a cover glass 244 having parallel surfaces 246 and 248 and a display glass having a curved surface 250. Additionally FIG. 12 shows cover glass 260 having a wedge shaped end view and a display 262 having a surface 268 (not to scale) that is rotated around axis 264 in a counter clockwise direction so that surface 268 is not parallel with surface 270 of cover glass 260. Alternatively cover glass 260 could be rotated around axis 280 so that surfaces 270 and 268 are not parallel.

An economical structure and method which facilitate the reduction of the magnitude of the luminosity and the reduction of the clarity or edge sharpness of unwanted reflections from the cover and from the display has been described. Also such structure to enables the easy and economical replacement of the display cover.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles.

What is claimed is:

1. An electronic display for providing visual information being viewed by a user, the display having a first surface portion which tends to reflect an undesirable image of an object external to the display into the view of the user, said undesirable image tending to interfere with the information, said display comprising:

a cover positioned next to said first surface portion of said electronic display, said cover having a second surface portion arranged to be non parallel to said first surface portion; and said first and second surface portions thereby reflecting separate dispersed images of the object to thereby provide reduced interference with the visual information being viewed by the user.

2. The electronic display of claim 1 wherein said cover has a curved surface.

3. The electronic display of claim 1 wherein said cover is concave.

4. The electronic display of claim 1 wherein said cover is convex.

5. The electronic display of claim 1 wherein said cover has an undulating surface.

6. The electronic display of claim 1 wherein the first surface portion has a curved surface.

7. The electronic display of claim 1 wherein the first surface portion is convex.

8. The electronic display of claim 1 wherein said first and second surface portions are planar.

9. The electronic display of claim 1 wherein said cover further has a third surface portion arranged to be non parallel to said first surface portion; and said first and third portions thereby reflecting separate images of the external object.

10. The electronic display of claim 9 wherein said cover has a wedge shaped side view.

11. The electronic display of claim 9 wherein said first surface portion is rotated about an axis with respect to said second surface portion so that said first portion is not parallel to said second portion.

12. An electronic display providing visual information to a user, the electronic display having a first planar surface portion which tends to reflect an undesirable image of an object external to the display into the view of the user, the undesirable image having a luminosity of a first magnitude, said display further including:

cover positioned next to the first planar surface portion of said electronic display;

said cover having a second planar surface portion separated from said first planar surface portion by a gap, said cover further having a third surface portion which is substantially non parallel to said first and second planar surface portions; and said third surface portion reflecting a separate image of the external object than the image reflected by the first planar surface portion of the display, each of said separate images providing less interference with the visual information provided by the display than the separate images would if they were superimposed on each other.

13. The display of claim 12 wherein said third surface portion is curved.

14. The display of claim 12 wherein said cover has a square shaped front view.

15. The display of claim 12 further including a polarizing layer positioned in said gap.

16. The display of claim 15 wherein an anti-reflective coating is provided on at least one of said polarizing layer, the first planar surface or said cover.

17. A method for reducing the magnitude of the luminosity and the edge clarity of an undesired external image reflected from a first surface of a display into the eye of a user comprising the steps of:

placing a cover in the path of the reflected image;

arranging said cover to have a second surface to be not parallel to the first surface of the display; and reflecting the image from the second surface of the cover and the first surface of the display to provide multiple images of the undesired image each having a luminosity magnitude which is less than the magnitude of the luminosity of the undesired image if the second surface of the cover was parallel to the first surface of the display.

18. The method as claimed in claim 17 further comprising the step of providing an air gap between said cover and said portion of the surface of the display.

19. The method as claimed in claim 18 further including the step of polarizing the light traveling through said air gap.

* * * * *